(12) United States Patent
Chi

(10) Patent No.: US 6,338,768 B1
(45) Date of Patent: Jan. 15, 2002

(54) METHOD FOR MANUFACTURING A SHOE INSOLE

(76) Inventor: Cheng-Te Chi, No. 4, Alley 6, Lane 145, Yuan-Huan East Rd., Feng-Yuan City, Taichung Hsien (TW)

(*) Notice: Subject to any disclaimer, the term of this patent is extended or adjusted under 35 U.S.C. 154(b) by 0 days.

(21) Appl. No.: 09/611,883

(22) Filed: Jul. 7, 2000

(51) Int. Cl.$^7$ .......................... A43D 9/00; A43B 13/38; B32B 31/00
(52) U.S. Cl. .................. 156/269; 12/142 K; 12/142 N; 12/14 R; 36/44; 36/71; 156/267; 156/245
(58) Field of Search .......................... 12/146 R, 146 B, 12/142 K, 146 BP, 146 BC, 146 BR, 146 M, 142 N; 36/43, 44, 71; 156/269, 267, 245, 242; 428/218

(56) References Cited

U.S. PATENT DOCUMENTS

| | | | | |
|---|---|---|---|---|
| 812,384 A | * | 2/1906 | Thoma | 442/149 |
| 1,228,997 A | * | 6/1917 | Wear | 36/44 |
| 1,959,382 A | * | 5/1934 | Neton | 36/8.1 |
| 2,065,405 A | * | 12/1936 | Sewall | 12/146 B |
| 2,845,640 A | * | 8/1958 | Murray | 12/146 B |
| 3,080,589 A | * | 3/1963 | Midgley | 12/146 S |
| 3,892,077 A | * | 7/1975 | Wolstenholme et al. | 36/44 |
| 4,627,178 A | * | 12/1986 | Sullivan et al. | 36/44 |
| 4,627,179 A | * | 12/1986 | McElroy | 36/44 |
| 5,687,441 A | * | 11/1997 | Rachman et al. | 12/142 R |

* cited by examiner

Primary Examiner—Paul T. Sewell
Assistant Examiner—Jila M. Mohandesi
(74) Attorney, Agent, or Firm—Connolly Bove Lodge & Hutz LLP

(57) ABSTRACT

A method is provided for manufacturing a shoe insole. First, high density thermoplastic material and low density thermoplastic material are conveyed through two feed pipes respectively into a heated pressing machine. When the high and low density thermoplastic materials are conveyed through a mold head of the pressing machine, they are heated and pressed to bond with each other to form an elongated flat dual density plastic plate structure which is then rolled by rollers of a rolling machine so as to fit the thickness of a shoe insole. A non-woven fabric is then adhered on a top face and a bottom face of the elongated flat dual density plastic plate structure which is then rolled and flattened by the rollers of a rolling machine, and is then cut by a cutting machine into a plurality of dual density shoe insole blanks, each of which is then heated and pressed by a heat forming mold so as to form a shoe insole product which includes a rear heel support portion made of the high density thermoplastic material and a front sole support portion made of the low density thermoplastic material.

2 Claims, 5 Drawing Sheets

METHOD FOR MANUFACTURING A SHOE INSOLE

BACKGROUND OF THE INVENTION

1. Field of the Invention

The present invention relates to a method for manufacturing a shoe insole.

2. Description of the Related Art

A conventional shoe sole in accordance with the prior art is made of stiff abrasion resistant material, and a shoe insole together with a soft shoe pad is coated on the top face of the rigid shoe sole. However, it is necessary to additionally provide an iron core member or fixing paper plate on the heel portion of the shoe sole for reinforcing the structural strength of the heel of the shoe, and for preventing the heel of the shoe from being distorted or deformed due to bearing a force, thereby complicating the construction of the shoe, and thereby greatly increasing the time and cost of fabrication or increasing the weight of the shoe. In addition, the conventional shoe insole is a buffer pad so that it cannot be adapted to reinforce the structural strength of the heel portion of the shoe sole, thereby limiting the versatility of the shoe insole.

SUMMARY OF THE INVENTION

The present invention has arisen to mitigate and/or obviate the disadvantage of the conventional shoe insole.

In accordance with one aspect of the present invention, there is provided a method for manufacturing a shoe insole comprising the steps of: conveying high density thermoplastic material and low density thermoplastic material through two feed pipes respectively into a heated pressing machine in a spiral manner, when the fused high density thermoplastic material and the fused low density thermoplastic material are conveyed through a mold head of the pressing machine, the fused high density thermoplastic material and the fused low density thermoplastic material are heated and pressed to bond with each other to form an elongated flat dual density plastic plate structure, the elongated flat dual density plastic plate structure is then rolled by rollers of a rolling machine so as to fit a thickness of a shoe insole, a non-woven fabric is then adhered on a top face and a bottom face of the elongated flat dual density plastic plate structure, the elongated flat dual density plastic plate structure together with the non-woven fabric is then rolled and flattened by rollers of a rolling machine, the elongated flat dual density plastic plate structure is then cut by a cutting machine into a plurality of dual density shoe insole blanks, and each of the dual density shoe insole blanks is then heated and pressed by a heat forming mold to form a shoe insole product which includes a rear heel support portion made of the high density thermoplastic material and a front sole support portion made of the low density thermoplastic material.

Preferably, the rear heel support portion of the shoe insole product has a periphery integrally molded with an arcuate curved surface.

In accordance with another aspect of the present invention, there is provided a method for manufacturing a shoe insole comprising the steps of: conveying low density thermoplastic material through a feed pipe into a heated pressing machine in a spiral manner, the low density thermoplastic material is rolled through the pressing machine to be heated and pressed by the pressing machine so as to form a wedge-shaped plastic plate structure, a non-woven fabric is then adhered on a top face and a bottom face of the wedge-shaped plastic plate structure, the wedge-shaped plastic plate structure is then cut by a cutting machine into a plurality of wedge-shaped shoe insole blanks, and each of the wedge-shaped shoe insole blanks is then heated and pressed by a heat forming mold to form a shoe insole product which includes a rear heel support portion having a greater thickness and a front sole support portion having a smaller thickness.

Preferably, the rear heel support portion of the shoe insole product has a periphery integrally molded with an arcuate curved surface.

Further benefits and advantages of the present invention will become apparent after a careful reading of the detailed description with appropriate reference to the accompanying drawings.

DETAILED DESCRIPTION OF THE INVENTION

Figure 1:
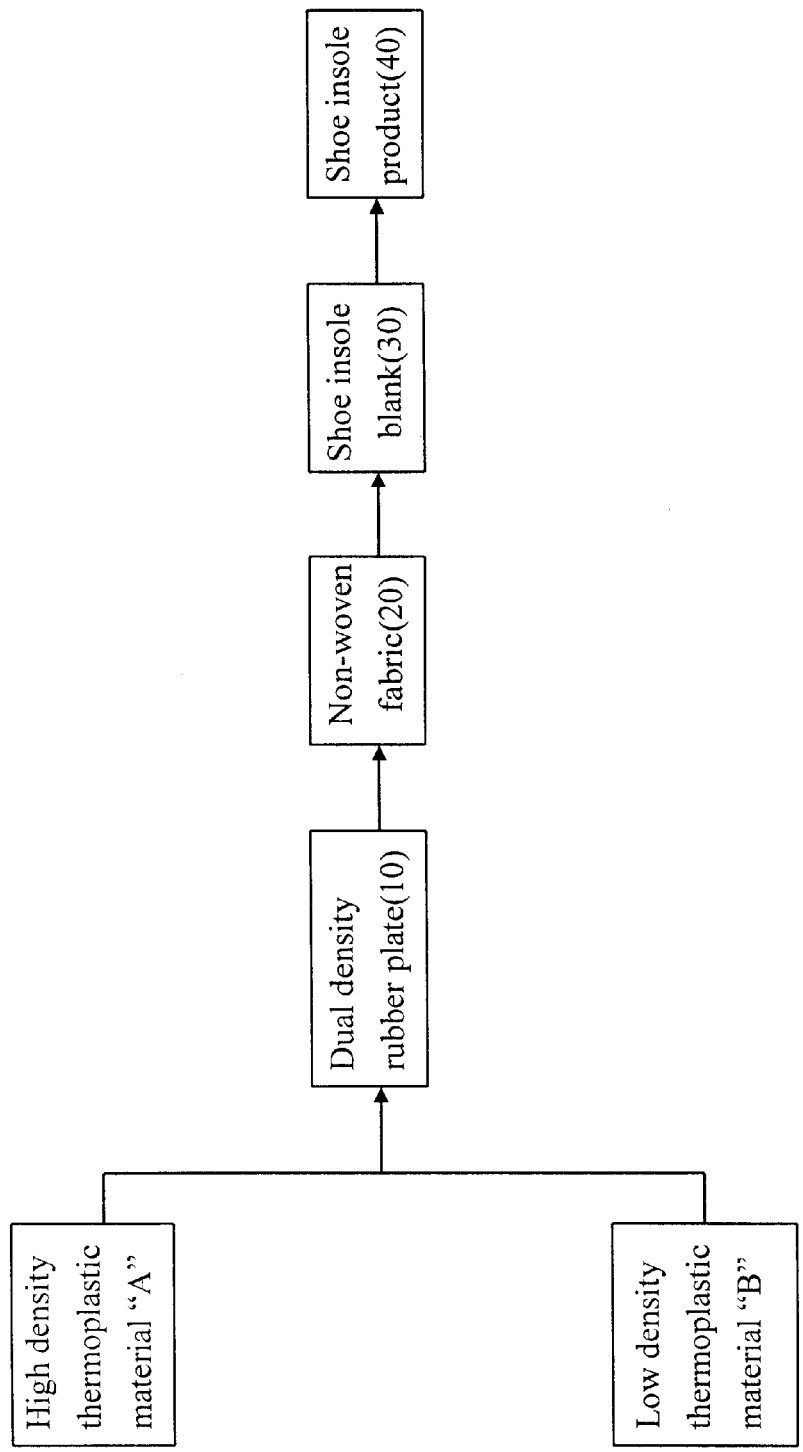
FIG. 1 is a flow chart of a method for manufacturing a shoe insole in accordance with the invention.

Referring to the drawings and initially to FIGS. 1–5, a method for manufacturing a shoe insole 40 in accordance with the present invention comprises the steps described as follows.

Figure 2:
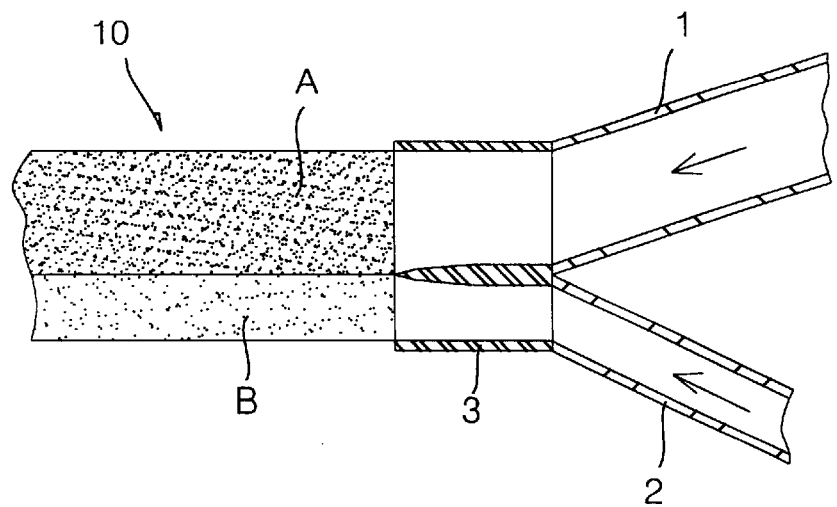
FIG. 2 is a cross-sectional view of a pressing machine for performing the method as shown FIG. 1.
Figure 3:
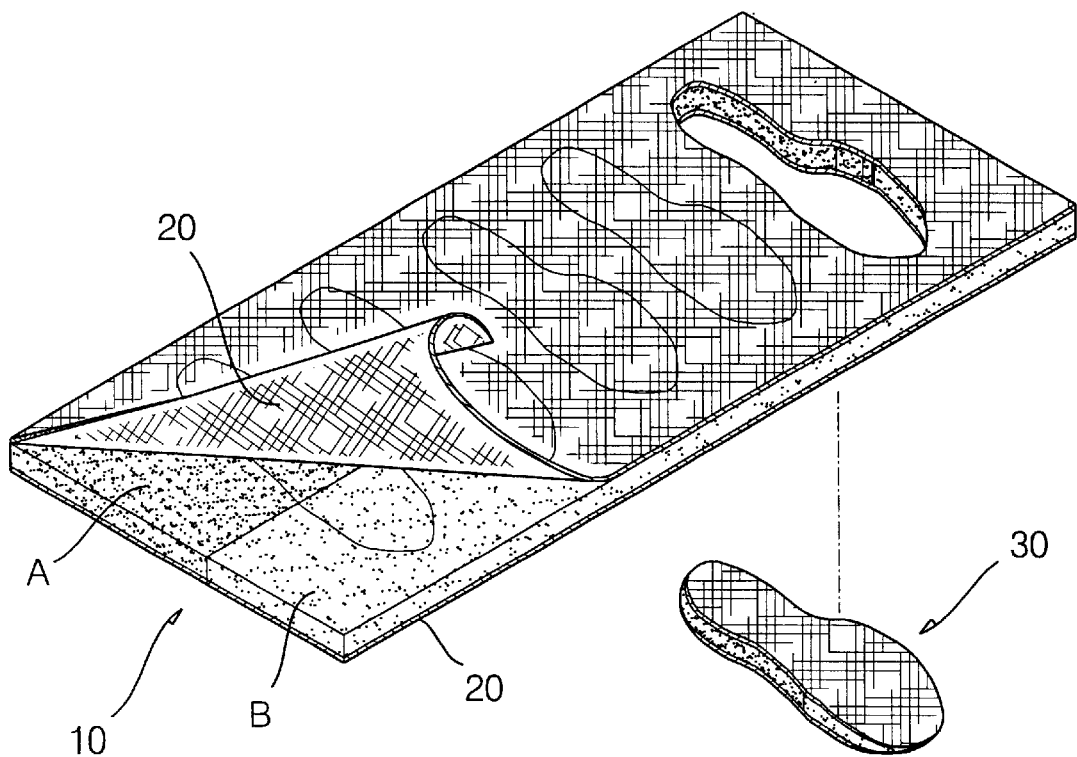
FIG. 3 is a perspective view of an elongated flat dual density plastic plate structure in accordance with the present invention.
Figure 4:
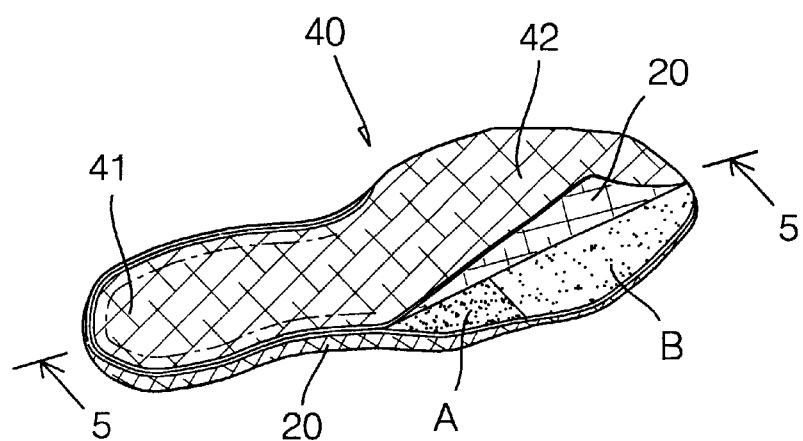
FIG. 4 is a perspective view of a shoe insole in accordance with the present invention.

First, high density thermoplastic material "A" and low density thermoplastic material "B" are respectively conveyed through two feed pipes 1 and 2 into a heated pressing machine in a spiral manner. When the fused high density thermoplastic material and "A" the fused low density thermoplastic material "B" are conveyed through the mold head 3 of the pressing machine, the fused high density thermoplastic material "A" and the fused low density thermoplastic material "B" are heated and pressed to bond with each other to form an elongated flat dual density plastic plate structure 10 as shown in FIG. 2 which has two distinct layers "A" and "B". The elongated flat dual density plastic plate structure 10 is then rolled by rollers of a rolling machine so as to fit a thickness of a shoe insole 40. A non-woven fabric 20 is then adhered on the top face and the bottom face of the elongated flat dual density plastic plate structure 10. The elongated flat dual density plastic plate structure 10 together with the non-woven fabric 20 is then rolled and flattened by rollers of a rolling machine. The elongated flat dual density plastic plate structure 10 is then cut by a cutting machine into a plurality of dual density shoe insole blanks 30 as shown in FIG. 3. Each of the dual density shoe insole blanks 30 is then heated and pressed by a heat forming mold to form a shoe insole product 40 as shown in FIG. 4 which includes a rear heel support portion 41 made of the high density thermoplastic material "A" and a front sole support portion 42 made of the low density thermoplastic material "B".

Figure 5:
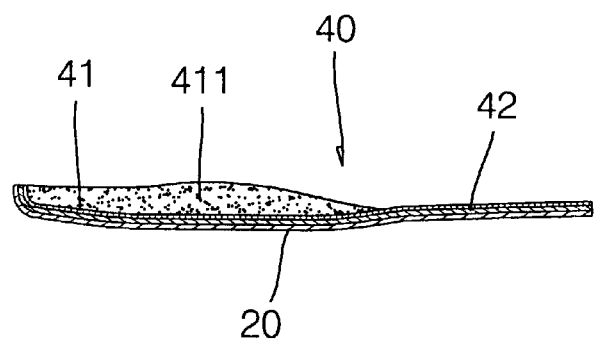
FIG. 5 is a side plan cross-sectional view of the shoe insole as shown in FIG. 4.
Figure 6:
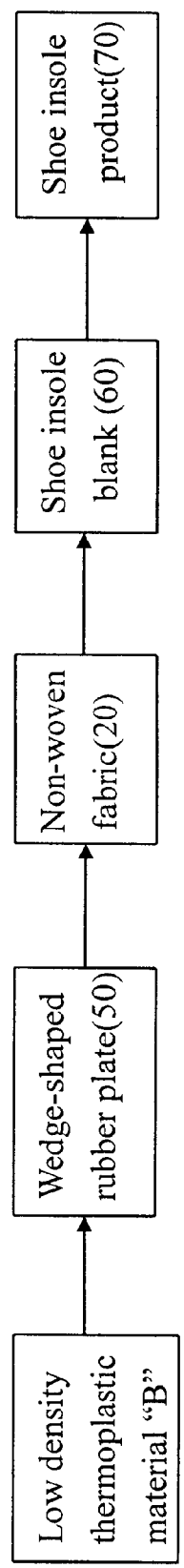
FIG. 6 is a flow chart of a method for manufacturing a shoe insole in accordance with another embodiment of the present invention.

Preferably, the rear heel support portion 41 of the shoe insole product 40 has a periphery integrally molded with an arcuate curved surface 411 as shown in FIG. 5 so that the rear heel support portion 41 of the shoe insole product 40 can be adapted to efficiently fit the size of the user's heel, thereby enhancing the comfort of the shoe insole product 40.

According to the present invention, the rear heel support portion 41 and the front sole support portion 42 of the shoe insole 40 are integrally formed by two thermoplastic materials of different densities by means of the heated and pressed process.

The rear heel support portion 41 of the shoe insole 40 is made of the high density thermoplastic material "A" so that the rear heel support portion 41 of the shoe insole 40 is rigid and will not easily deform, thereby increasing and reinforcing the structural strength of the shoe insole 40 and the shoe sole so that the shoe sole will not be distorted and deformed due to bearing stresses. In addition, it is unnecessary to provide a conventional iron core member or fixing paper plate on the heel portion of the shoe sole.

On the other hand, the front sole support portion 42 of the shoe insole 40 is made of the low density thermoplastic material "B" so that the front sole support portion 42 of the shoe insole 40 can be properly distorted and deformed so as to fit the size of the user's sole, thereby enhancing the comfort of the shoe insole.

Referring to FIGS. 6–9, a method for manufacturing a shoe insole 70 in accordance with another embodiment of the present invention comprises the steps described as follows.

Figure 7:
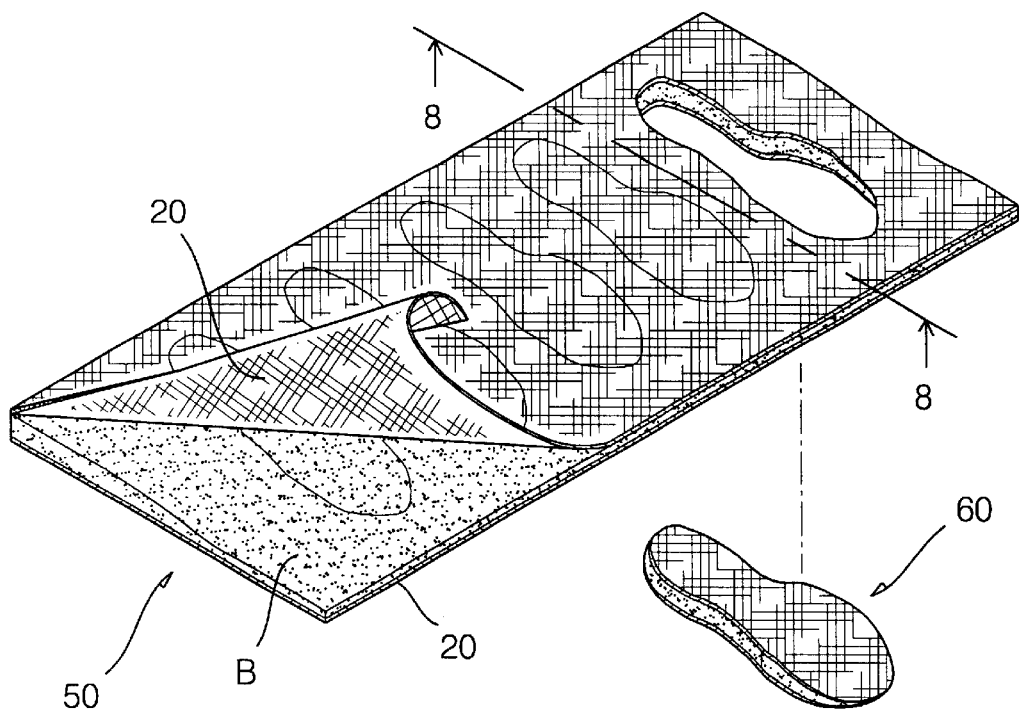
FIG. 7 is a perspective view of a wedge-shaped plastic plate structure in accordance with the present invention.
Figure 8:
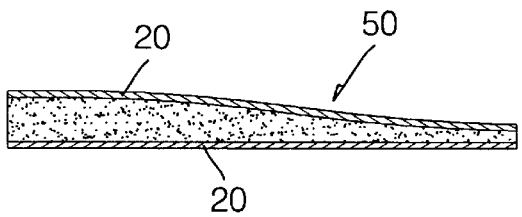
FIG. 8 is a side plan cross-sectional view of the wedge-shaped plastic plate as shown in FIG. 7.
Figure 9:
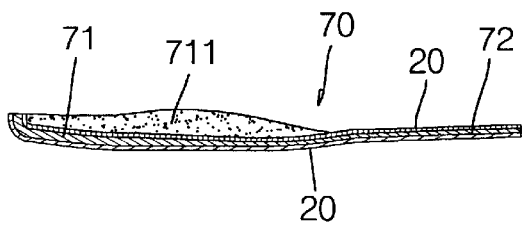
FIG. 9 is a side plan cross-sectional view of a shoe insole in accordance with the present invention.

First, a low density thermoplastic material "B" is conveyed through a feed pipe into a heated pressing machine in a spiral manner. Then, the low density thermoplastic material "B" is rolled through the pressing machine to be heated and pressed by the pressing machine so as to form a wedge-shaped plastic plate structure 50 as shown in FIG. 7. A non-woven fabric 20 is then adhered on the top face and the bottom face of the wedge-shaped plastic plate structure 20 as shown in FIG. 8. The wedge-shaped plastic plate structure 50 is then cut by a cutting machine into a plurality of wedge-shaped shoe insole blanks 60. Each of the wedge-shaped shoe insole blanks 60 is then heated and pressed by a heat forming mold to form a shoe insole product 70 as shown in FIG. 9 which includes a rear heel support portion 71 having a greater thickness and a front sole support portion 72 having a smaller thickness.

Preferably, the rear heel support portion 71 of the shoe insole 70 has a periphery integrally molded with an arcuate curved surface 711 so that the rear heel support portion 71 of the shoe insole 70 can be adapted to efficiently fit the size of the user's heel, thereby enhancing the comfort of the shoe insole 70.

The front sole support portion 72 of the shoe insole 70 is made of the low density thermoplastic material "B" so that the front sole support portion 72 of the shoe insole 70 can be properly distorted and deformed so as to fit the size of the user's sole, thereby enhancing the comfort of the shoe insole.

On the other hand, the rear heel support portion 71 of the shoe insole 70 is made of a thicker thermoplastic material so that the rear heel support portion 71 of the shoe insole 70 is rigid enough to increase and reinforce the structural strength of the shoe insole 70 and the shoe sole so that the shoe sole will not be distorted and deformed due to bearing stresses.

It is appreciated that, the high density thermoplastic material and the low density thermoplastic material are polyethylene, nylon, A.B.S. etc.

Accordingly, in accordance with the present invention, the high density thermoplastic material and the low density thermoplastic material are respectively conveyed by two feed pipes into a pressing machine to integrally form an elongated flat dual density plastic plate structure, or alternatively, in accordance with another embodiment of the present invention, the low density thermoplastic material is rolled through a pressing machine to be heated and pressed by the pressing machine so as to form a wedge-shaped plastic plate structure. Then, the plastic plate structure can be largely and rapidly cut into a plurality of shoe insole blanks, and each of the shoe insole blanks is then heated and pressed by a heat forming mold so as to form a shoe insole product which includes a rear heel support portion and a front sole support portion.

Therefore, the method in accordance with the present invention can be adapted to simplify the steps and procedures for making a shoe insole, and to increase the productivity and quality of the shoe insole, thereby decreasing the cost of fabrication.

It should be clear to those skilled in the art that further embodiments may be made without departing from the scope of the present invention.

What is claimed is:

1. A method for manufacturing a shoe insole comprising the steps of:

conveying high density thermoplastic material and low density thermoplastic material through two feed pipes respectively into a heated pressing machine in a spiral manner, when said fused high density thermoplastic material and said fused low density thermoplastic material are conveyed through a mold head of said pressing machine, said fused high density thermoplastic material and said fused low density thermoplastic material are heated and pressed to bond with each other to form an elongated flat dual density plastic plate structure, said elongated flat dual density plastic plate structure is then rolled by rollers of a rolling machine so as to fit a thickness of a shoe insole, a non-woven fabric is then adhered on a top face and a bottom face of said elongated flat dual density plastic plate structure, said elongated flat dual density plastic plate structure together with said non-woven fabric is then rolled and flattened by rollers of a rolling machine, said elongated flat dual density plastic plate structure is then cut by a cutting machine into a plurality of dual density shoe insole blanks, and each of said dual density shoe insole blanks is then heated and pressed by a heat forming mold to form a shoe insole product which includes a rear heel support portion made of said high density thermoplastic material and a front sole support portion made of said low density thermoplastic material.

2. The method in accordance with claim 1, wherein said rear heel support portion of said shoe insole product has a periphery integrally molded with an arcuate curved surface.

* * * * *